(12) United States Patent
DeNatale et al.

(10) Patent No.: US 7,987,714 B2
(45) Date of Patent: Aug. 2, 2011

(54) DISC RESONATOR GYROSCOPE WITH IMPROVED FREQUENCY COINCIDENCE AND METHOD OF MANUFACTURE

(75) Inventors: Jeffrey F. DeNatale, Thousand Oaks, CA (US); Philip A. Stupar, Oxnard, CA (US)

(73) Assignee: The Boeing Company, Chicago, IL (US)

( * ) Notice: Subject to any disclaimer, the term of this patent is extended or adjusted under 35 U.S.C. 154(b) by 888 days.

(21) Appl. No.: 11/871,502

(22) Filed: Oct. 12, 2007

(65) Prior Publication Data

US 2009/0095077 A1   Apr. 16, 2009

(51) Int. Cl.
*G01C 19/00* (2006.01)
(52) U.S. Cl. .................................. 73/504.13; 29/592.1
(58) Field of Classification Search ............... 73/504.13, 73/504.02, 504.12; 29/592.1, 595
See application file for complete search history.

(56) References Cited

U.S. PATENT DOCUMENTS

| | | | |
|---|---|---|---|
| 6,944,931 B2 * | 9/2005 | Shcheglov et al. | 29/595 |
| 7,040,163 B2 * | 5/2006 | Shcheglov et al. | 73/504.13 |
| 7,168,318 B2 * | 1/2007 | Challoner et al. | 73/504.13 |
| 7,347,095 B2 * | 3/2008 | Shcheglov et al. | 73/504.13 |
| 7,401,397 B2 * | 7/2008 | Shcheglov et al. | 29/595 |
| 7,581,443 B2 * | 9/2009 | Kubena et al. | 73/504.12 |
| 7,624,494 B2 * | 12/2009 | Challoner et al. | 29/595 |
| 7,793,541 B2 * | 9/2010 | Challoner | 73/504.13 |
| 7,818,871 B2 * | 10/2010 | Shcheglov | 29/592.1 |
| 2004/0055381 A1 * | 3/2004 | Shcheglov et al. | 73/504.12 |
| 2005/0017329 A1 * | 1/2005 | Hayworth et al. | 257/659 |
| 2005/0172714 A1 * | 8/2005 | Challoner et al. | 73/504.12 |
| 2010/0058861 A1 * | 3/2010 | Kuang et al. | 73/504.12 |

FOREIGN PATENT DOCUMENTS

RU           2058527 C1 *   4/1996

* cited by examiner

*Primary Examiner* — Hezron Williams
*Assistant Examiner* — Samir M Shah
(74) *Attorney, Agent, or Firm* — Harness, Dickey & Pierce, P.L.C.

(57) ABSTRACT

A disc resonator gyroscope (DRG) and method of manufacture. The DRG has a surrounding pattern of bond metal having a symmetry related to the symmetry of a resonator device wafer that enables more even dissipation of heat from a resonator device wafer of the DRG during an etching operation. The metal bond frame eliminates or substantially reduces the thermal asymmetry that the resonator device wafer normally experiences when a conventional, square bond frame is used, which in turn can cause geometric asymmetry in the widths of the beams that are etched into the resonator device wafer of the DRG.

17 Claims, 9 Drawing Sheets

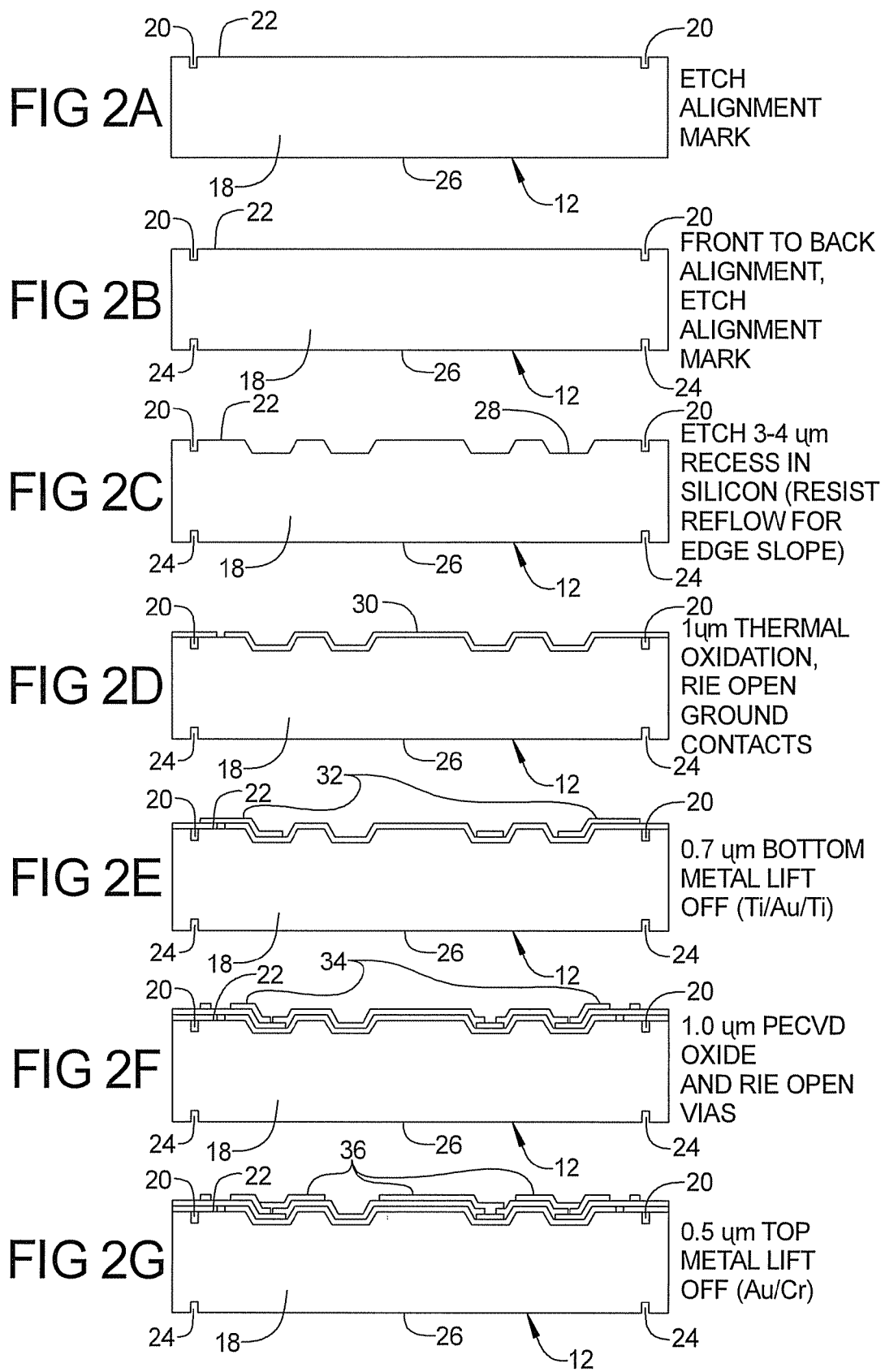

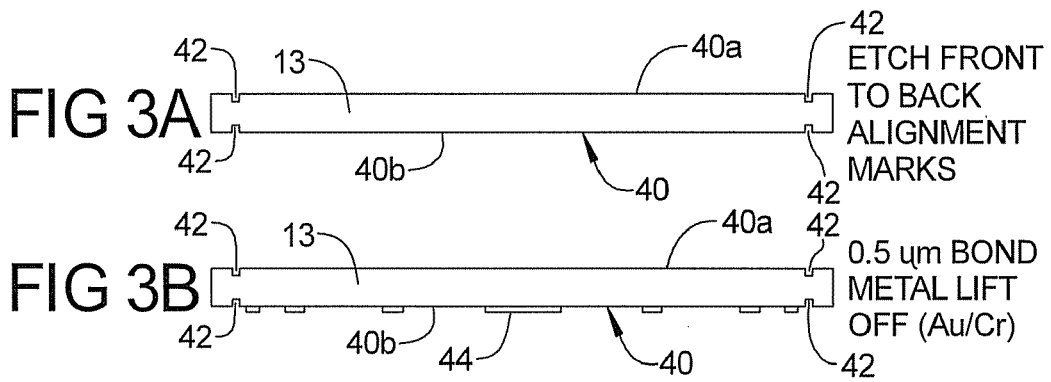
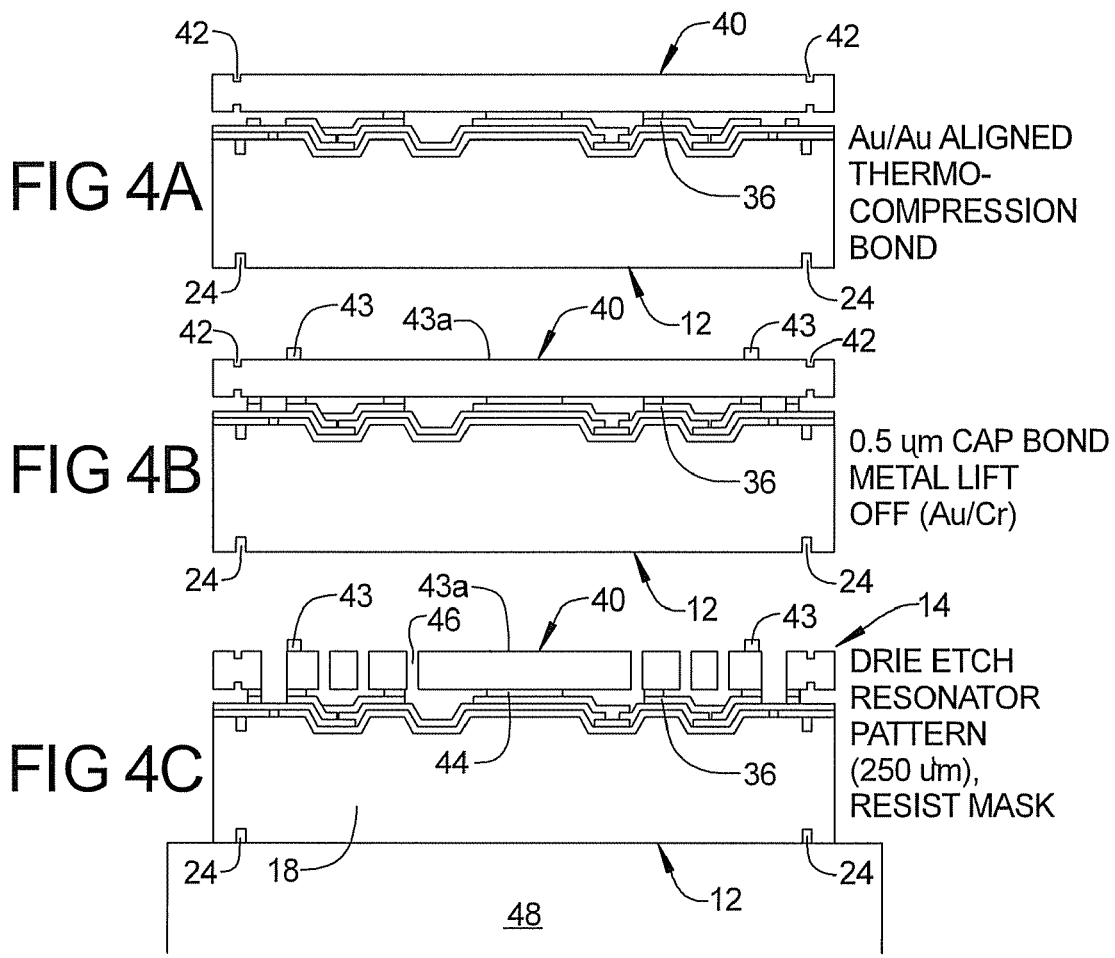

PATTERNED PORTION OF RESONATOR

DISC RESONATOR GYROSCOPE WITH IMPROVED FREQUENCY COINCIDENCE AND METHOD OF MANUFACTURE

FIELD

The present disclosure relates to disc resonator gyroscopes and their manufacture, and more particularly for a disc resonator gyroscope and method of making same that reduces or eliminates the frequency offset between the radial vibrational modes of the gyroscope, and thus improves frequency coincidence of the two vibrational axes of the gyroscope used for driving and sensing the device, respectively.

BACKGROUND

The statements in this section merely provide background information related to the present disclosure and may not constitute prior art.

MEMS (micro-electromechanical system) gyroscopes, such as the silicon disc resonator gyroscope (DRG) are typically operated with a single mechanical resonant frequency on both the drive and sense axes of the DRG. Due to manufacturing variations, there is typically a frequency offset between the two vibrational modes of the DRG used for driving and sensing the motion, respectively, that must be corrected by a means such as electrostatic tuning or mass trimming to bring the two frequencies into coincidence. The inventors have discovered that during etching of the resonator pattern on the resonator wafer of the DRG, asymmetric conduction of heat during the etching process can cause subtle dimensional variations in the arcuate slots created during the etching process. More specifically, the inventors have discovered that during the etching process, hotter regions of the resonator wafer tend to etch faster and have more mask undercut than cooler areas. This difference in temperature can result in etching that produces arcuate slots in the resonator wafer that are either slightly larger or smaller in cross sectional dimension, than a desired design dimension. Put differently, the difference in various regions of the resonator wafer during the etching process can cause geometric asymmetry of the resulting slots, and thus the beams that are formed in the resonator wafer. These differences (i.e., variations) in cross sectional dimension for the slots result in beams being created that can be either slightly thicker than desired, or slightly thinner than desired, which introduces a variation in the mechanical compliance of the beams, and hence vibrational frequency, for different radial orientations of the gyroscope. This variation in sensitivity is manifested in the above-mentioned frequency offset that is present between the two vibrational modes of the DRG used for drive and sense, respectively, that must be corrected. Slight differences in beam thickness, on the order of tens of nanometers, can give rise to frequency offsets of order 20-40 Hz for DRG structures designed for a resonant frequency of order 14 kHz. This asymmetry can arise even for a fully symmetric resonator pattern.

Correction of the frequency offset introduces additional cost and complexity into the DRG, or into its manufacture. Correction typically has been accomplished by subsequent electronic tuning of the DRG or physically trimming portions of the resonator wafer to bring the two vibrational modes into coincidence. Electronic tuning adds to complexity in the electronic circuitry, and tuning voltage instability can degrade apparent device performance. Physical trimming of the resonator requires additional processing, such as laser trimming, that is both expensive and time consuming.

SUMMARY

The present disclosure is directed to a disc resonator gyroscope and a method for manufacturing same that provides for reduced geometric asymmetry, and thus improved performance.

In one implementation, a method of manufacturing a disc resonator gyroscope (DRG) that produces improved geometric symmetry of the gyroscope is disclosed. The method includes the operations of forming a substrate base wafer having a patterned metal bonding layer on one surface of the substrate base wafer, with the patterned metal bond layer having a first symmetry. A resonator device wafer is bonded to the patterned metal bonding layer. Etching of the resonator device wafer is then performed in accordance with a pattern having a second symmetry to remove regions of material from the resonator device wafer to define the vibratory structure for the resonator device wafer. The second symmetry has a relationship to the first symmetry that significantly enhances thermal symmetry in the resonator device wafer during the etching process. In addition to providing mechanical attachment, the metal bonding layer operates to provide a heat conduction path from the resonator device wafer to the substrate base wafer. This metal layer can thus impact the thermal symmetry created in the resonator device wafer during the etching operation. Hence, the patterned metal bonding layer is formed to reduce the geometric asymmetry created during the etching operation.

In various implementations the patterned metal bonding layer may be formed by gold or a combination of gold with appropriate adhesion layers (such as chromium or titanium) and diffusion barrier layers (such as titanium tungsten or tungsten nitride). The bonding of the substrate base wafer to the resonator device wafer may be accomplished by thermocompression bonding, fusion bonding, transient liquid phase bonding and eutectic bonding, or by any other suitable bonding means.

In one specific implementation the patterned metal bonding layer comprises a plurality of arcuately shaped metal bonding pads disposed uniformly about a peripheral area of the substrate base wafer. In another implementation a plurality of circular metal bonding pads are arranged circumferentially about the resonator device wafer. In still another implementation the patterned metal bonding layer comprises an overall square shape but with the corners thereof filled in with metal to produce a generally circular opening within the metal bonding layer. In each of the foregoing arrangements, the metal bonding pads help to reduce thermal-asymmetry in the resonator device wafer during etching of the resonator device wafer, which in turn helps to reduce geometric asymmetry of the etched slots in the resonator device wafer.

In one specific embodiment a disc resonator gyroscope is formed that has a substrate base wafer having a patterned metal bonding layer about a peripheral area of the substrate base wafer, on one surface of the substrate base wafer. The patterned metal bonding layer has a first symmetry. A resonator device wafer is bonded to the patterned metal bonding layer, with the resonator device wafer subsequently being etched to remove material in select areas. The etched areas have a second symmetry. The first and second symmetries have a relation to enable generally uniform thermal conductivity in the resonator device wafer during etching of the patterned areas of the resonator device wafer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 2A-2G are a series of simplified side views that illustrate a series of manufacturing operations in forming one embodiment of a substrate base wafer for a disc rate gyroscope of the present disclosure;

FIGS. 3A and 3B illustrate exemplary operations for forming a resonator device wafer of the present gyroscope;

FIGS. 4A-4C illustrate exemplary operations for thermocompression bonding the substrate base wafer to the resonator device wafer;

DETAILED DESCRIPTION

The following description is merely exemplary in nature and is not intended to limit the present disclosure, application, or uses.

Figure 1:
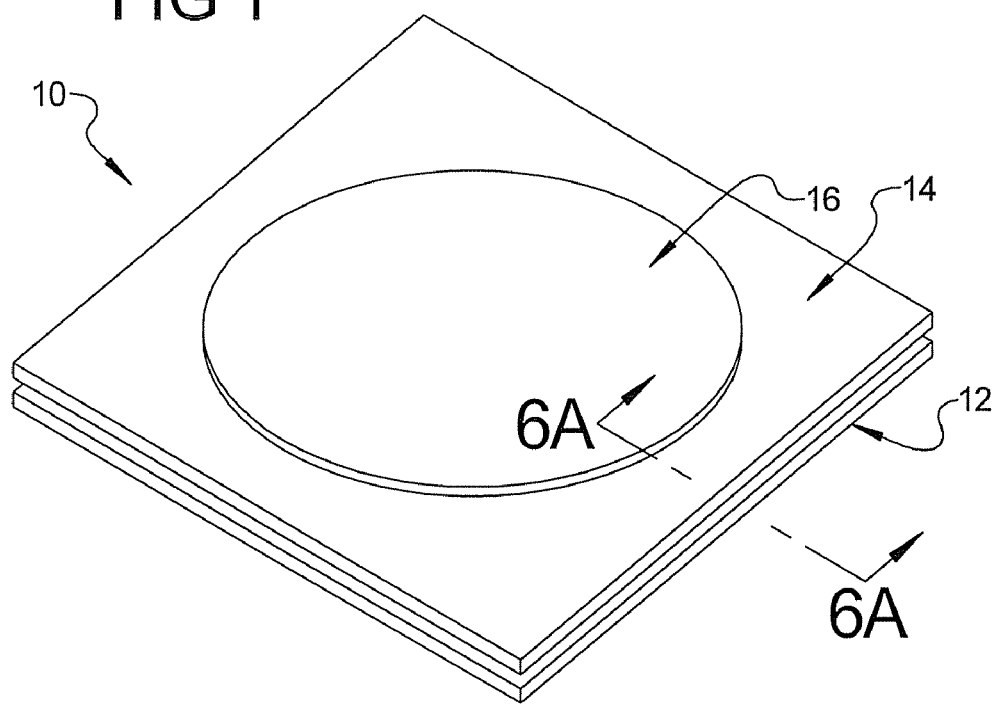
FIG. 1 is a perspective view of a disc resonator generator (DRG) in accordance with one embodiment of the present disclosure.

Referring to FIG. 1, there is shown a silicon disc resonator gyroscope (hereinafter "DRG") 10 in accordance with one embodiment of the present disclosure. The DRG 10 includes a substrate base wafer 12, a resonator device wafer 14 (shown only in phantom lines) and a cap 16. As will be explained more fully in the following paragraphs, the substrate base wafer 12 and the resonator device wafer 14 may be bonded together, for example by thermocompression bonding, fusion bonding, transient liquid phase bonding, eutectic bonding, or by any other suitable bonding means. Similarly, the cap 16 may be secured to the resonator device wafer 14 by any of the above-mentioned methods.

Referring to FIGS. 2A-2G, a brief overview of one exemplary method for forming the substrate base wafer 12 will be described. It will be appreciated that the following description describes a known process for forming the substrate base wafer 12, and is being provided simply to aid the reader with a basic understanding of the major operations in forming the various layers of the substrate 12. The substrate base wafer 12 begins with a substrate wafer 18, which may be silicon, quartz or any other suitable material, but simply for the purpose of discussion will be a silicon substrate wafer. A pair of alignment features 20 are formed on or in a first surface 22 of the substrate wafer 18. In FIG. 2B a second pair of alignment features 24 are formed on or in an opposing second surface 26 of the substrate wafer 18 and are aligned to the first pair of alignment features 20. In FIG. 2C, recesses 28 having a depth of typically about 1.0 um-5.0 um are formed in the first surface 22. In FIG. 2D, an insulator layer 30 is formed on to the first surface 22, preferably by thermal oxidation of the silicon (Si) substrate to an oxide thickness of approximately 1.0 um. In FIG. 2E, a first layer of metal 32 (typically gold) on the order of 0.7 um thick is deposited over the insulator layer 30 at selected locations. In FIG. 2G, a 1.0 um insulator layer 34 is formed over portions of the first metal layer 32. In FIG. 2G, a second (or "top") metal layer 36 is formed over portions of the insulator layer 34. The result is the substrate base wafer 12 that forms a portion of the DRG 10.

FIGS. 3A and 3B illustrate operations in forming the resonator device wafer 14. This begins by forming front to back alignment features 42, preferably by etching, on or in upper and lower surfaces 40a and 40b, respectively, of a resonator wafer 40. In FIG. 3B, metal 44, typically gold or gold/chromium may be deposited onto one surface of the wafer 40. The metal 44 will be used in subsequent operations to bond the two wafers 40 and 18 together.

Referring now to FIGS. 4A-4C, exemplary operations for bonding the substrate base wafer 12 and the resonator device wafer 14 together will be described. In FIG. 4A, the wafers 12 and 14 are aligned using the alignment features 20, 24 and 42 and secured together, for example by thermocompression bonding, fusion bonding, transient liquid phase bonding, eutectic bonding, or by any other suitable securing operation. During this operation the metal layers of the resonator device wafer 14 are physically bonded to the top metal layer 36 of the substrate base wafer 12. In FIG. 4B metal cap bond material 43 is formed on an upper surface 43a of the resonator wafer 40. In FIG. 4C, optical lithography methods may be used to create a photoresist pattern on surface 40b. This pattern may be used as an etch mask to selectively remove portions of the resonator wafer 40 in a micromachining operation. The micromachining operation creates, by etching, a precision pattern of slots 46 in the resonator wafer 40 that enables the wafer 14 to operate as the resonator device wafer 14, and to thus form the movable portion of the DRG 10 and interleaved static electrodes. The slots 46 in this example are about 25 um in width and etched to a depth of about 270 um. During the etching process the substrate base wafer 12 is typically positioned on a cold plate 48 to help cool the resonator device wafer 14. Although not illustrated, the last operation is the etching and bonding, using bonding techniques such as described above, of a cap (such as cap 16 in FIG. 1) to physically cover selected portions of the resonator device wafer 14. The formation and attachment of the cap over the resonator device wafer 14 prevents dirt and contaminants from entering into the slots 46 and may alternately be used to create a hermetic vacuum environment around the device. Additional details on the basic construction process described above are available from U.S. patent application Ser. No.

10/639,135 to Shcheglov et al., entitled "Integral Resonator Gyroscope", filed Aug. 12, 2003, the disclosure of which is hereby incorporated by reference in the present disclosure. The substrate base wafer 12 may optionally also include layers to improve adhesion and layers to prevent interdiffusion. Such adhesion layers may be formed using materials such as chromium or titanium and the diffusion barrier layers may be selected from among Titanium Tungsten (TiW), Titanium Nitride (TiN), Tungsten Nitride (WN), Platinum (Pt), Molybdenum (Mo), and Molybdenum Nitride (MoN). It will be appreciated that the diffusion barrier layers help to prevent the diffusion of the material (e.g., gold) into the substrate material (often silicon) of the substrate base wafer 12 and the resonator device wafer 14 during the bonding of the layers 12 and 14.

Figure 5:
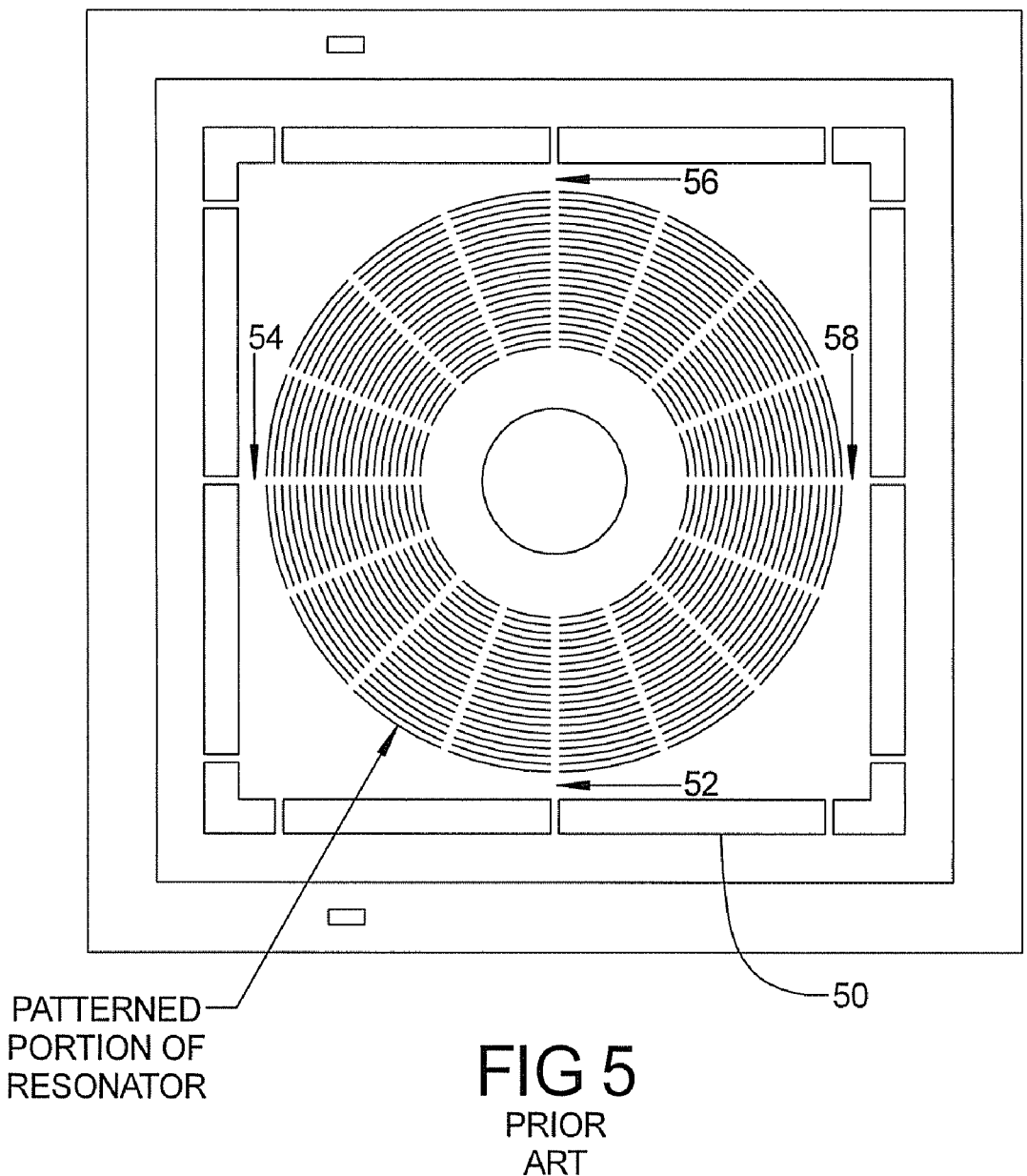
FIG. 5 is an illustration showing, in a plan view, a layout of a prior art resonator bond frame and the areas where the resonator bond frame acts to significantly dissipate heat from the resonator device wafer during etching of the slots in the resonator device wafer.

With brief reference to FIG. 5, a plan view of a typical prior art metal-resonator bonding layer pattern showing in particular the region of the bond frame 50. The region of the bond frame 50 circumscribes the patterned (i.e., etched) area of a prior art substrate base wafer. The bonding layer pattern defines the locations where the resonator device wafer 14 is mechanically bonded to the substrate base wafer 12. The resonator bond frame 50 essentially forms a peripheral metal ring around the patterned portion (i.e., rings and stationary electrodes) of the resonator device wafer and is formed or deposited on the substrate base wafer prior to the securing of the substrate base wafer and the resonator wafer together. The resonator bond frame 50 effectively forms a peripheral wall for the DRG.

During the etching of the resonator device wafer (not shown in FIG. 5), heat generated in the resonator wafer by etching is dissipated through the metal-to-metal bonded areas between the base substrate and resonator wafers, through the base wafer, and ultimately to the cold plate 48 onto which the wafers are supported during etching. It has also been found by the inventors that a tangible amount of heat is also dissipated through the resonator bond frame 50, particularly for those rings that are in close proximity to the areas 52, 54, 56 and 58 in FIG. 5; in other words, for those rings that are closely adjacent the resonator bond frame 50. This variation in proximity of the heat conduction path to the etched rings can cause thermal asymmetry in the resonator device wafer during the etching operation explained in connection with FIG. 4C. The thermal asymmetry can in turn result in geometric asymmetry of the slots that are etched in to the resonator device wafer 14, and thus variations in the widths of the beams that are formed between the slots. The asymmetry in beam width can cause a corresponding asymmetry in mechanical compliance, and can cause the beams to vibrate differently along different axial vibrational axes. The geometric asymmetry necessitates frequency tuning, which may require a relatively high tuning bias voltage to be applied to a DRG to account for the geometric asymmetry of the mechanical compliance. This increases the cost and complexity of the tuning circuit for the DRG and can degrade device performance by virtue of fluctuations of the tuning voltage.

Figure 6A:
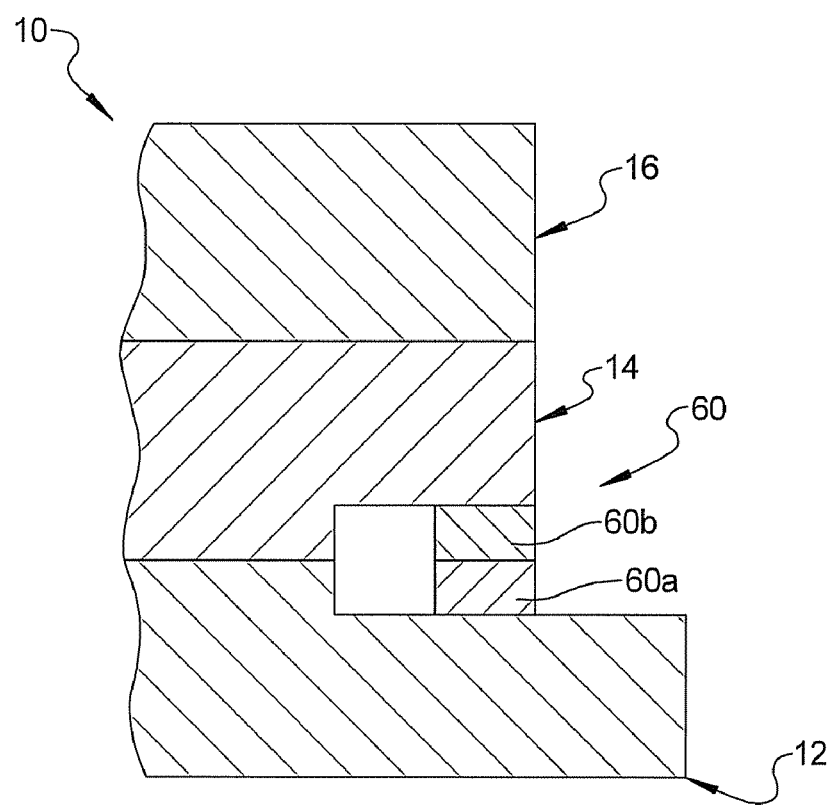
FIG. 6A is a highly enlarged, cross-sectional view of one metal bond frame pad formed on the substrate base wafer, in accordance with section line 6A-6A in FIG. 1, and also showing the alignment and attachment of its associated mating bond pad on the inner surface of the resonator device wafer.
Figure 6:
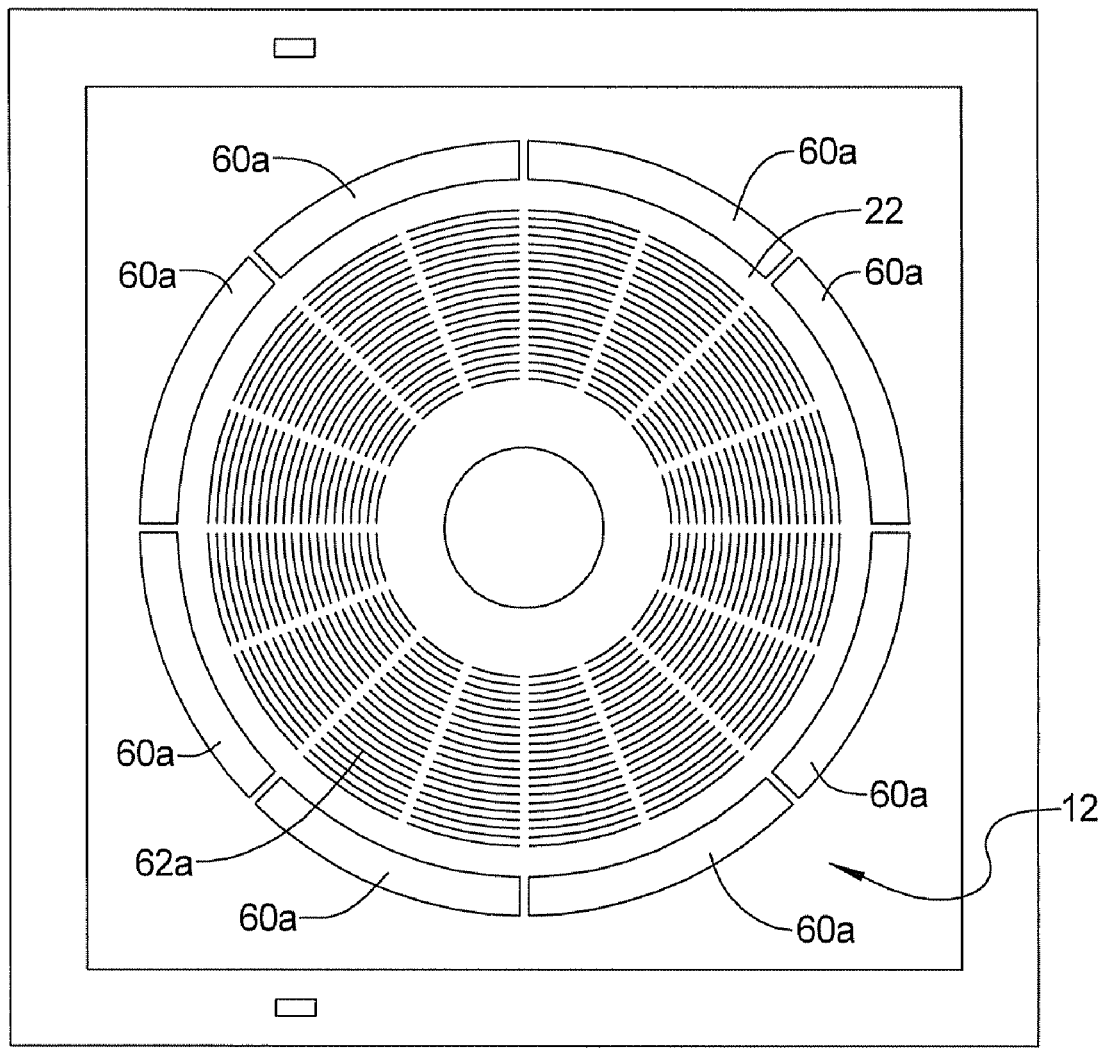
FIG. 6 is a plan view of one exemplary layout for the metal bonding layer used with the disc resonator gyroscope of the present disclosure.
Figure 7:
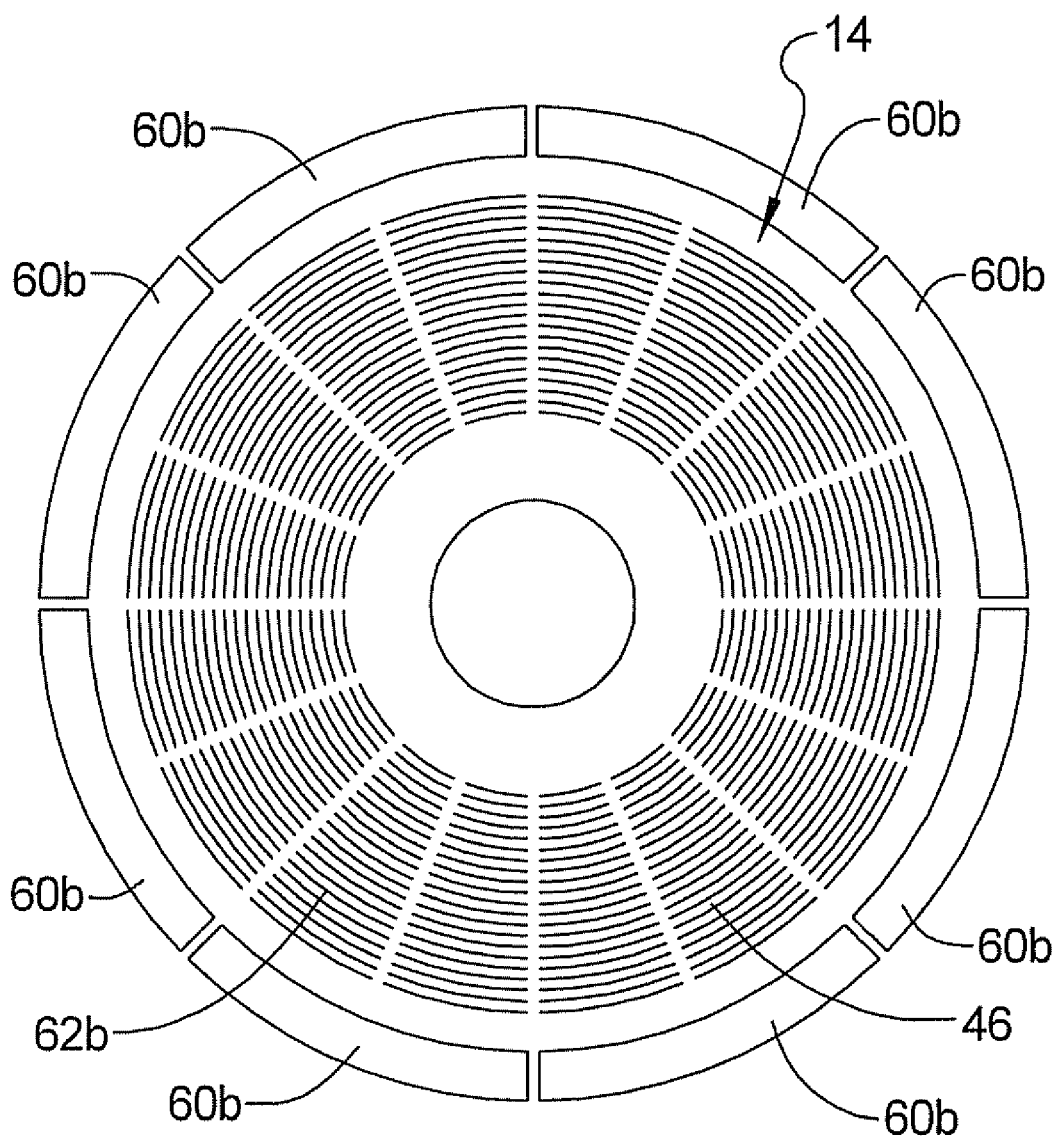
FIG. 7 is a plan view of an inside surface of the resonator device wafer prior to securing to the substrate base wafer.

Referring to FIG. 6, one embodiment of a bond frame 60 that is used in the DRG 10 is shown. Again, the illustration is a plan view of the substrate base wafer 12 with the bond frame 60 thereon. FIG. 7 shows the actual resonator device wafer 14, which has a circular shape, and has a diameter large enough to overlay the bond frame 60.

Referring further to FIGS. 6 and 6A, the bond frame 60 in this example is comprised of a plurality of arcuate shaped metal bond pads or layers 60a (FIG. 6) that are formed on the upper surface 22 of the substrate base wafer 12, and in a circle around the pattern 62a of grooves, and mating arcuate shaped metal bond pads 60b (FIG. 6A) that are formed on the lower surface 40b of the resonator device wafer 14 around the pattern 62b of slots 46. The arcuate shaped metal bond pads 60a and 60b are aligned and secured together during the bonding of the two wafers 12 and 14 (FIG. 6A) to form the bond frame 60. Thus, when the wafers 12 and 14 are bonded together, the metal bond pads 60a and 60b cooperatively form the metal bond frame 60, which represents a series of arcuate metal pads having a desired height (typically on the order of 0.5 um to 2.0 um), and which are separated from the pattern 62b of slots 46 by a uniform distance at all points around the circumference of the pattern 62b of slots 46. This uniform spacing of the metal bond pads 60a,60b from the periphery of the pattern 62b of slots 46 ensures that the metal bond frame 60 acts uniformly in dissipating heat from the outermost slots 46 of the pattern 62b during the etching process. The metal bond frame 60 enables excellent geometric symmetry to be achieved in the etched pattern 62b of slots 46. The metal bond frame 60 may be made from gold, a combination of gold and chromium, or any other suitable material.

Figure 10:
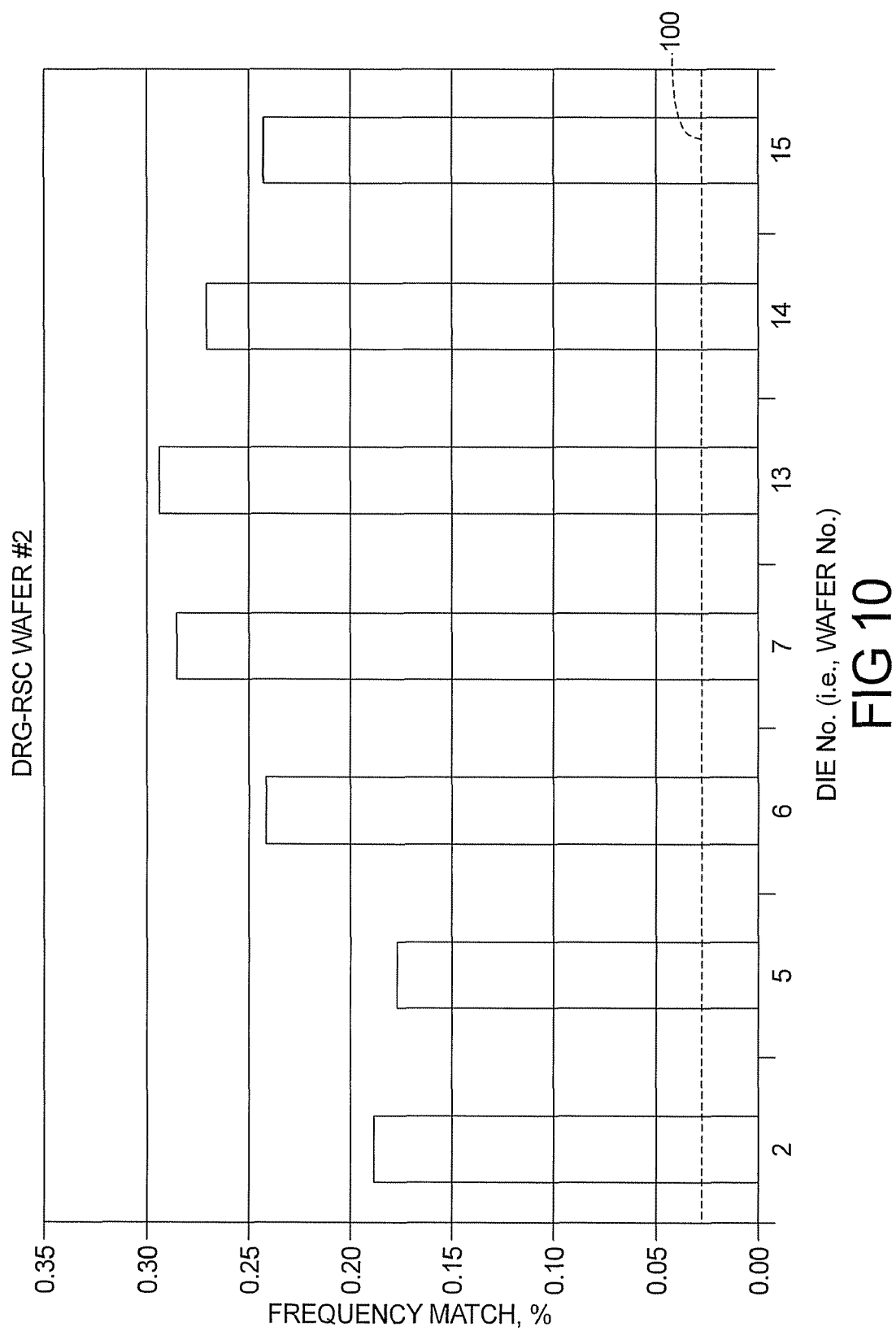
FIG. 10 is a graph illustrating the improvement in frequency co-incidence between the orthogonal vibratory modes of a prior art DRG and a DRG of the present disclosure having the metal bond frame described herein.

With brief reference to FIG. 10, the significant improvement in frequency co-incidence between the two radial vibratory modes corresponding to the drive and sense orientations is illustrated. The dashed line 100 in FIG. 10 illustrates the frequency co-incidence of a silicon DRG formed with the rotationally symmetric metal bond frame 60 matched to the symmetry of the resonator pattern. The frequency mismatch between the two radial vibrational modes is reduced to only about 0.025% for devices from a wafer incorporating this feature. The frequency co-incidence of devices from a similar wafer fabricated without the symmetric metal bond frame 60, 70 or 80 of the present application is substantially higher and is illustrated by the bar graphs.

Figure 8:
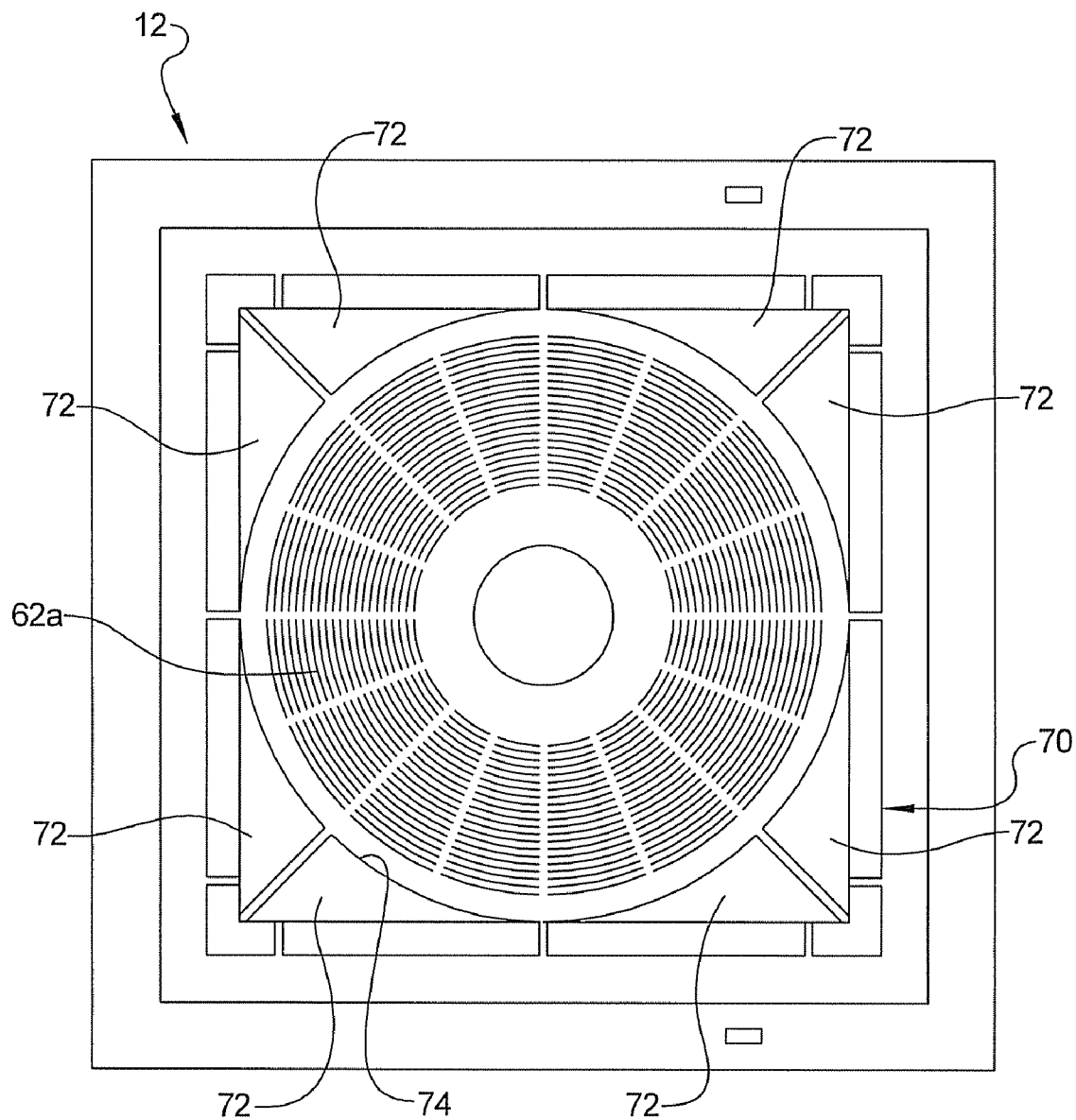
FIG. 8 is a plan view of another layout for the metal bonding layer in which the corner portions of the generally square shaped pattern are filled in with metal.

FIG. 8 shows a different embodiment of the bond frame 70. In this embodiment the bond frame has a generally square outer periphery, but inside corners 72 are filled with metal material to keep the spacing between the inner periphery 74 of the bond frame 70 the outer periphery of the pattern 62a of slots uniform around the entire pattern 62a. The bond frame 70 is preferably formed from gold, a combination of gold and chromium, or any other suitable metal. In this embodiment it will be appreciated that the resonator device wafer 14 will have a metal bond frame layout symmetrical to that of bond frame 70, which is bonded to the bond frame 70 during bonding of the two wafers 12 and 14.

Figure 9:
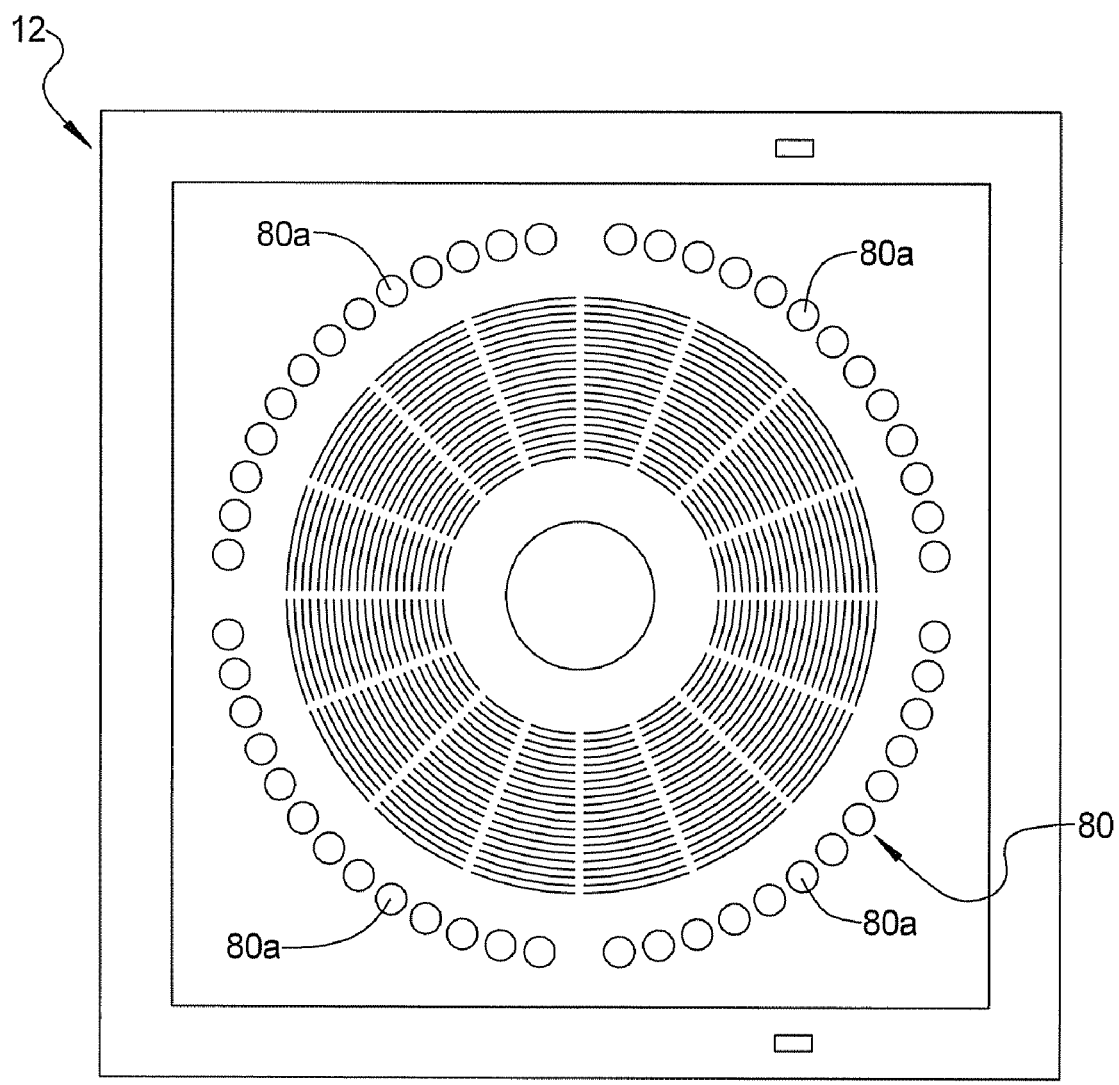
FIG. 9 is a plan view of another layout for the metal bonding layer in which a plurality of generally circular metal bond pads are arranged in a circumferential pattern.

FIG. 9 shows a bond frame 80 in accordance with another embodiment. The bond frame 80 is formed by a plurality of generally circular metal pads 80a that form an overall circular ring around the outer periphery of the pattern 62 of slots. The circular metal pads 80a serve to maintain thermal symmetry of the resonator device wafer 14 during the etching process. The bond frame 80 may be formed from gold, a mixture of gold and chromium, or any other suitable metal or metallic compound. In this embodiment it will be appreciated that the resonator device wafer 14 will include a similar plurality of circular metal pads that bond to the metal pads 80a during the bonding of the wafers 12 and 14.

From the foregoing discussion, it will be apparent that the various metal bond frames discussed herein contribute to a construction for the DRG 10 that enables the DRG to be made with significantly enhanced thermal symmetry during the etching of the resonator device wafer 14. It will also be appreciated that while the discussion above has been limited to the pattern of the bond metal used to adhere the resonator device wafer 14 to the substrate base wafer 12, other patterns and photomask designs (such as for the resonator etching, cap bond metal and cap etch) will likely also need to be modified accordingly for self-consistent construction of the DRG 10.

For example, the pillar etch (i.e., the pattern of recesses in the substrate base wafer 12), the resonator device wafer bond metal 44 (FIG. 3B), the top base substrate metal 36 (FIG. 2G), the resonator cap metal 43 (FIG. 3B), the etch for the resonator device wafer 14, and the etch for the cap device (not shown) may all need to be modified.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of manufacturing a disc resonator gyroscope (DRG) that produces improved geometric symmetry of the gyroscope, comprising:
    forming a resonator device wafer;
    forming a substrate base wafer having a patterned metal bonding layer on one surface thereof, the patterned metal bonding layer having a first symmetry;
    bonding said resonator device wafer to said patterned metal bonding layer;
    etching said resonator device wafer in accordance with a pattern having a second symmetry to remove regions of material from said resonator device wafer, said second symmetry having a relationship to said first symmetry; and
    said first and second symmetries enhancing thermal symmetry in said resonator device wafer during said etching operation to reduce geometric asymmetry in said resonator device wafer during said etching operation.

2. The method of claim 1, wherein forming a substrate base wafer having a patterned metal bonding layer comprises forming a substrate base wafer having a plurality of arcuately shaped metal bonding regions with a desired symmetry disposed uniformly about a peripheral area of the resonator device wafer.

3. The method of claim 1, wherein forming a substrate base wafer having a patterned metal bonding layer comprises forming a substrate base wafer having a metal bonding layer that includes a non-uniform area when viewed in plan.

4. The method of claim 3, wherein forming said substrate base wafer having a metal bonding layer that includes a non-uniform area includes forming a square shaped metal bond layer around the resonator device wafer, wherein the metal bonding layer includes a plurality of corner portions between the resonator device wafer, with the corner portions filled with metal.

5. The method of claim 1, wherein forming a substrate base wafer having a patterned metal bonding layer comprises forming a substrate base wafer having a plurality of metal bonding pads disposed about a peripheral portion of the resonator device wafer on the substrate base wafer.

6. The method of claim 5, wherein forming a substrate base wafer having a patterned metal bonding layer comprises forming a substrate base wafer having a plurality of circular metal bonding pads formed in a general circumferential pattern about a peripheral area of said substrate base wafer.

7. The method of claim 1, wherein:
    forming a substrate base wafer comprises forming a substrate base wafer from silicon; and
    forming a resonator device wafer comprises forming a resonator device wafer from silicon.

8. The method of claim 1, wherein:
    forming a substrate base wafer comprises forming a substrate base wafer from quartz; and
    forming a resonator device wafer comprises forming a resonator device wafer from quartz.

9. The method of claim 1, wherein said bonding operation comprises one of:
    thermocompression bonding;
    fusion bonding;
    transient liquid phase bonding; and
    eutectic bonding.

10. The method of claim 1, wherein forming a substrate base wafer having a patterned metal bonding layer comprises forming a substrate base wafer having a patterned gold bonding layer.

11. The method of claim 1, wherein forming a substrate base wafer having a patterned metal bonding layer comprises forming a substrate base wafer having a patterned gold bonding layer that also includes adhesion layers to improve adhesion and diffusion barriers to prevent interdiffusion.

12. The method of claim 11, wherein the adhesion layers are selected from one of chromium and titanium and the diffusion barriers are selected from among Titanium Tungsten (TiW), Titanium Nitride (TiN), Tungsten Nitride (WN), Platinum (Pt), Molybdenum (Mo), and Molybdenum Nitride (MoN).

13. The method of claim 1, wherein forming a resonator device wafer comprises forming a resonator device wafer from Silicon.

14. The method of claim 1, wherein forming a resonator device wafer comprises forming a resonator device wafer from quartz.

15. A disc resonator gyroscope (DRG) comprising:
    a substrate base wafer having a patterned metal bonding layer on one surface about a peripheral area thereof; said patterned metal bonding layer having a first symmetry;
    a resonator device wafer bonded to said patterned metal bonding layer within an area circumscribed by said patterned metal bonding layer, the resonator device wafer having etched areas where material thereof has been removed to form vibratory structure, and said etched areas having a second symmetry;
    said first and second symmetries having a relation to enable generally uniform thermal conductivity in said resonator device wafer during etching of said resonator device wafer to reduce a geometric asymmetry of said vibratory structure formed by said etched areas.

16. The disc resonator gyroscope of claim 15, wherein said resonator device wafer is one of:
    thermocompression bonded to said substrate base wafer;
    fusion bonded to said substrate base wafer;
    transient liquid phase bonded to said substrate base wafer; and
    eutectic bonded to said substrate base wafer.

17. The disc resonator gyroscope of claim 15, wherein said resonator device wafer and said substrate base wafer are each comprised of silicon.

* * * * *